Patented Oct. 27, 1936

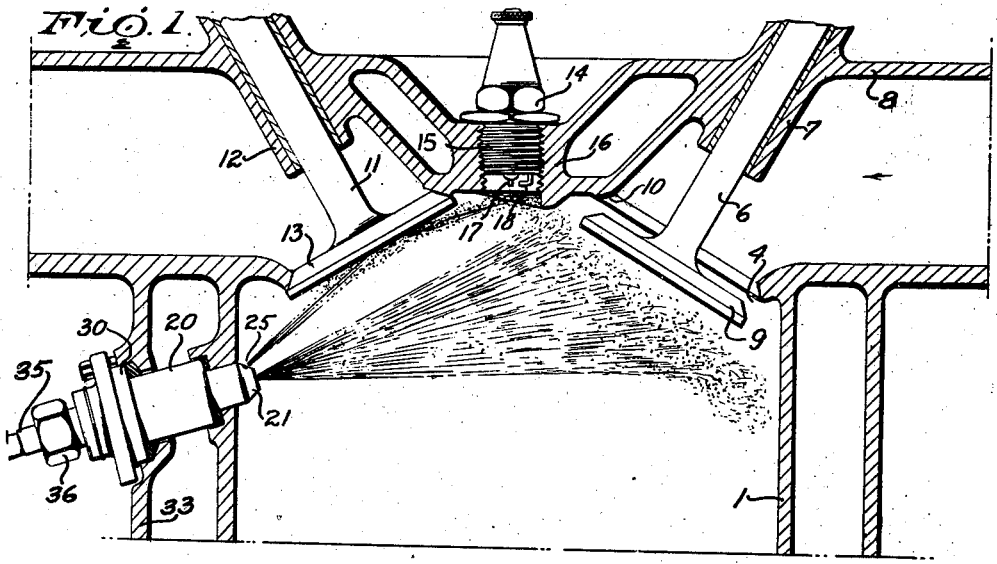
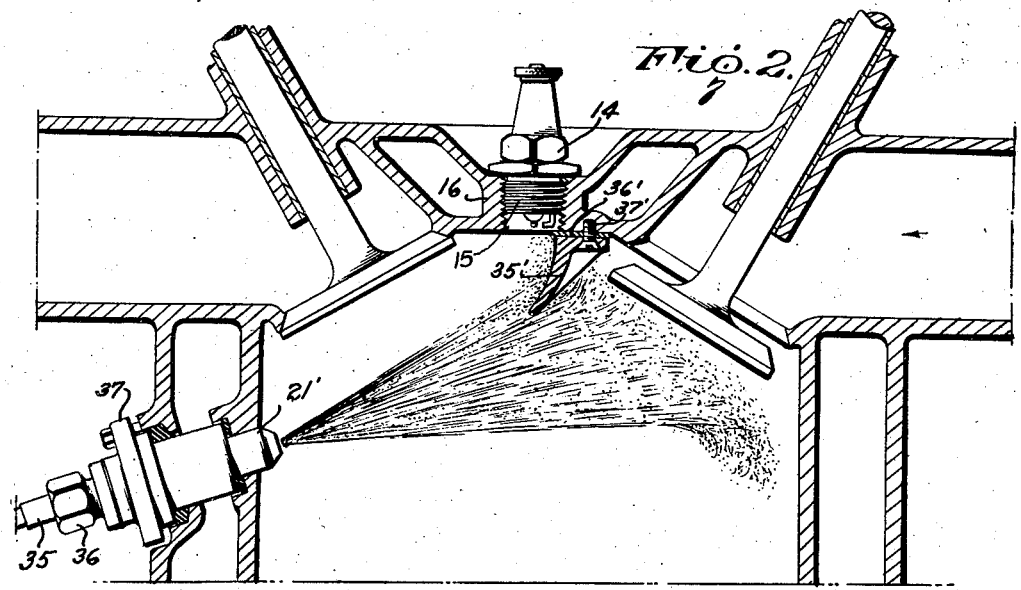
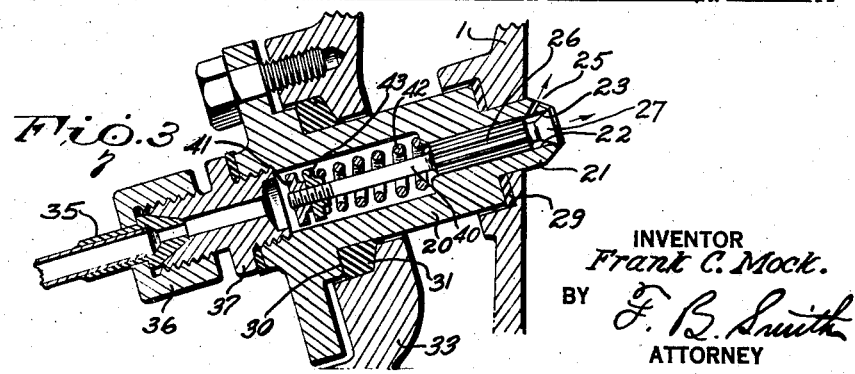

2,058,487

UNITED STATES PATENT OFFICE 2,058,487

INTERNAL COMBUSTION ENGINE

Frank C. Mock, East Orange, N. J., assignor to Bendix Research Corporation, East Orange, N. J., a corporation of Indiana Application January 26, 1931, Serial No. 511,348

8 Claims. (Cl. 123—32)

This invention relates to internal combustion engines and particularly to engines of the type in which the combustion fuel is injected in a solid or partially solid state; although in certain respects to be hereinafter explained, the invention is further applicable to engines in which the fuel is carbureted as a vapor into the supply of combustion supporting air or other media.

An object of the invention is to provide novel means for introducing the supply of fuel to the combustion chambers of engines of the type above referred to.

A further object of the invention is to provide novel means for introducing fuel into combustion chambers of an engine of the foregoing character in such a manner as to increase the power obtainable from a given engine cylinder while at the same time decreasing the amount of fuel consumed in obtaining such increased power.

A further object of the invention is to provide novel fuel injecting means whereby the efficiency of combustion is increased, with an attendant rise in the range of speeds through which the engine may operate with high efficiency.

A further object of the invention is to provide novel fuel injecting means of the character above described which shall be so constructed and controlled as to minimize the amount of carbon deposited on the walls of the combustion chambers and also to be free from objection in the matter of unburned fuel and smoke in the exhaust from the combustion chambers.

A further object of the invention is to provide novel fuel control means for creating a homogeneous mixture of air and fuel spray throughout the combustion chamber both prior to and during the development of the combustion process.

A further object is to provide a novel method and means for securing more efficient combustion in engines of the foregoing character, such novel means involving the use of a prolonged fuel injection period, suitably timed to synchronize with the period of air admission to the combustion chambers, and suitably directed so as to produce maximum contact and permeation one with the other.

Other objects and advantages to be derived from the use of this invention will become apparent on inspection of the following description, with reference to the accompanying drawing wherein two embodiments of the invention are illustrated. It is to be expressly understood, however, that said drawing is for the purposes of illustration only and is not to be construed as a definition of the limits of the invention, reference being had to the appended claims for this purpose.

In the drawing,

Fig. 1 is a central vertical section through a device embodying the invention;

Fig. 2 is a similar sectional view of another embodiment of the invention; and

Fig. 3 is a sectional view of the fuel injector.

Referring to the drawing, particularly to Fig. 1, the embodiment therein illustrated comprises a combustion chamber having a cylindrical wall 1 surrounded by a cooling chamber, and having its upper portion or head arched to form a frusto-conical shaped chamber on the opposite sloping walls 3 and 4 of which are mounted intake and exhaust valves of similar construction, the intake valve being constituted by a stem 6, slidable in a bearing 7 formed on the supporting wall 8 and having a head 9 of usual construction adapted to be seated on the valve seat 10 and to be periodically lifted from said seat to admit the combustion supporting fluid to the cylinder 1 at the proper time in the engine cycle. The exhaust valve has corresponding parts 11, 12 and 13 for performance of the function of periodically exhausting the burned gases following each firing of the piston (not shown).

Means for producing the spark and igniting the fuel periodically introduced into the chamber 1 comprises a spark plug 14 having the usual threaded portion 15 adapted to be received in a correspondingly threaded opening in the cylinder head 16, and provided with the usual electrodes 17 and 18 across which a spark is produced upon generation of the necessary current by suitable ignition means of any well known design requiring no further description. As shown, the electrodes 17 and 18 of the spark plug are preferably positioned somewhat within the recess in head 16, the purpose of this arrangement being further explained hereinafter.

The novel fuel injecting means of the present invention comprises a cylindrical member 20 extending through the wall of cylinder 1 preferably at an angle such that the axis thereof intersects the axis of the stem 6 of the intake valve at approximately the central point of valve head 9. The cylindrical member or plug 20 has extending therefrom the nozzle member 21 comprising a centrally disposed rod 40 having one end threaded for the reception of lock nut 41 serving to retain the spring 42 in place on spring seat 43, the opposite end of the spring bearing against the shoulder formed on the member 20, the spring being properly adjusted to hold the nozzle 21 adjacent the outwardly tapering mouth 23 having an angle of taper such that the fuel ejected therefrom passes in a diverging path toward the valve head 9 with an angle of divergence such as to embrace the entire projected area of the said valve head, as indicated by the dash lines in Fig. 1.

Additional means are provided in the nozzle 21 for the purpose of directing a portion of the fuel charge toward the exhaust valve 13 and the spark plug electrodes 17 and 18. In the preferred form as illustrated, such means comprises a by-pass 25 extending obliquely through the head of nozzle 21 from the centrally disposed passage 22, the angle of deviation being such as to cause the fluid charge ejected therethrough to impinge against the surface of valve 13 at such an angle that it is deflected toward the recess in head 16 in which the electrodes 17 and 18 are located. The portion of the valve 27 which extends through the passage 22 is preferably fluted as shown at 26, to permit distribution of the fuel charge circumferentially. The fuel charge may be led to the valve chamber by any suitable means, as for example those indicated at 35, 36 and 37 in Fig. 3. The cylindrical portion 20 is preferably seated on a fairly hard gasket 29 provided with the recess in the wall of cylinder 1, while the shoulder 30 preferably abuts a similar but softer gasket 31 provided in the recess 32 formed in the walls of the water jacket 33.

In conjunction with the fuel injector mounting and construction just described, another important feature of the invention involves the timing and duration of the fuel injection action. In order to secure the greatest benefit from the novel disposition of parts above described, and to secure a sufficiently sustained permeating action between the fuel spray and the air charge, it is desirable to synchronize the time and duration of injection with that of the opening of the intake valve and also to provide means for automatically varying the amount of charge pumped to the valve chamber in accordance with the speed of the engine, and therefore the fuel is shown in the drawing as being injected while the intake valve is open.

From the foregoing description, it is apparent that upon each occasion of injection of the fuel spray into the combustion chamber, the major portion thereof will assume a direction such that it mixes with and is caught up by the air charge entering around the valve head 9, such action creating a turbulent effect in the portion of the chamber surrounding said valve. This direction of fuel spray toward the incoming air charge insures a high degree of mixture with the incoming air. At the same time the remainder of the fuel charge is directed against the hot surface of exhaust valve head 13, so that the charge becomes vaporized while approaching the vicinity of the electrodes 17 and 18, the ratio of volume passing through the obliquely disposed nozzle 21 to the volume passing through the mouth 23 varying with the amount of fuel pumped, which in turn, as above explained, varies with the speed of the engine. That is, during idling speeds (when the ignition is more difficult to maintain), the decrease in fuel pumped will produce a greater proportion of decrease in percentage of the charge passing through the mouth 23 and a lesser decrease in percentage of the charge passing through the passage 25, this variable ratio being a result of the novel construction above described, with particular reference to Fig. 3. As a consequence of this variable ratio and resultant maintenance of the preheating process with respect to the fuel impinging against the surface of the intake valve 11, it is possible to maintain ignition while the engine is receiving the reduced charges which otherwise would be too thin in vapor to ignite. Further, there is achieved the maintenance of a high degree of vapor density in the region surrounding the spark and adjacent, but protected from the region of maximum commingling action by setting the plug back a certain distance from the outer edge of the recess in head 16, in the manner above explained. By such means, a local high degree of vapor density, formed during injection of fuel, is maintained notwithstanding the inflow of air through the intake valve and notwithstanding the turbulence resulting from the rise of the piston on the compression stroke. Another method of protecting the fuel vapor in the vicinity of the spark plug and at the same time obtaining the same preheating effect as that above described, as indicated in Fig. 2 wherein there is provided a baffle plate 35′ extending downwardly below the spark plug recess and in the path of a portion of the fuel charge which, in this embodiment, preferably diverges over a wider path, such increased divergence being effected by widening the angle of taper at the mouth of nozzle 21′. This deflector 35′ may be of any suitable shape and material, but is preferably made of a metal having fair refractory qualities, and is so disposed and connected to the head of the cylinder as to maintain a temperature during engine operation which is above the vaporization point of the fuel but below the ignition point thereof. This temperature may be varied to meet the varying load and speed conditions by the use of any well known form of thermocouple or other thermostatic control, or by varying the position of attachment of the plate to the cylinder head so as to change the ratio of surface exposed to gases in cylinder to the surface in contact with the cylinder wall and through which surface a portion of the heat is conducted away. The amount of heat thus conducted away also depends upon the size and material used in the gasket 36′, which is preferably provided between the plate 35′ and the cylinder head, the two being held in place by suitable means 37′.

From the foregoing it is apparent that the invention provides novel combustion means insuring a high degree of combustion efficiency with a decided economy in fuel consumption and a practically complete absence of objectionable carbon deposits or smoke due to unburned fuel passing into the exhaust, these objectionable factors having been present in devices heretofore used due to the incomplete mixing of the air and fuel, the relative brevity of the period of fuel injection and lack of proper time relation between such injection and air intake, and the practice of injecting the fuel spray in the vicinity of the spark plug without prior heating and without mixing it with the air in the manner herein described, the latter practice having led to the use of a decidedly low ratio of air to fuel with the attendant objections of high fuel consumption, heavy carbon deposits and smoky exhaust.

It can readily be appreciated that it is not primarily the proximity of the fuel spray to the spark that governs the efficiency of ignition, but rather the vapor density in the region adjacent thereto; and in order to secure proper vapor density it is necessary not only to direct a portion of the fuel spray toward the spark plug, but also to preheat the fuel spray. Such preheating is accomplished without interfering with the proper directing of the fuel, by the use of the novel means above described. By the use of this novel means, in combination with proper timing thereof, as above explained, it is possible to secure a high vapor density around the spark plug with only a small portion of the total injected charge, the remainder of the charge being then available for complete mixture with the incoming air in the manner shown.

While two embodiments of the invention have been illustrated, it is to be understood that other embodiments within the scope of the present disclosure are possible and it is obvious that the fuel injectors of Figs. 1 and 2 may be interchanged if desired.

Thus, for example, the injector action of directing a solid or partly solid spray toward the spark plug electrodes may be associated by the introduction of a previously vaporized or carbureted fuel supply, thereby obtaining in a single engine the combined advantages of the carburetion and injection principles.

Similarly, by the use of the term igniting member in the appended claims, is meant any means, not necessarily an electric spark plug, for finally igniting the fuel after it has been previously heated and broken up by contact with the other hot surface or surfaces,—it being understood that a series of such surfaces providing multistage preheating, may be employed if desired. In fact, the use of a series of such surfaces greatly assists the igniting and breaking up processes since the duty of each unit is thereby lessened to the extent of the action of the co-operating members, and the danger of the charge being too great for the capacity of the unit is minimized.

Likewise, other changes, which will now appear to those skilled in the art, may be made in the form, details of construction and arrangement of the parts, without departing from the scope of the invention; and reference is therefore to be had to the appended claims for a definition of the limits of the invention.

What is claimed is:

1. In a device of the class described, in combination with an internal combustion engine chamber having intake and exhaust valves and a spark producing member positioned between said valves, a fuel nozzle directed into said chamber, and means in said nozzles for directing a portion of said charge toward said exhaust valve at the proper angle to produce deflection of the charge from the surface of said exhaust valve toward said spark producing member.

2. In a device of the class described, in combination with an internal combustion cylinder having a recess for reception of an electric igniting member, an intake valve, a deflecting member having a plane surface mounted in said cylinder in proximity to said igniting member, a fuel nozzle mounted in the side wall of said cylinder for directing a portion of the fuel charge from said nozzle to the plane surface of said deflecting member at the proper angle to cause deflection thereof from said deflecting member and directly upon said igniting member.

3. In a device of the class described, in combination with an internal combustion cylinder having a recess for reception of an igniting member, an intake valve, an exhaust valve mounted in said cylinder in proximity to said igniting member, a fuel nozzle mounted in said cylinder side wall, means for directing a portion of the fuel charge from said nozzle against said exhaust valve at the proper angle to cause deflection thereof from said exhaust valve directly against said igniting member, means for directing another portion of the fuel in a spray intersecting the gas flow through said intake valve, and said ignition member being arranged outside of the path of the gas issuing from said intake valve.

4. In a device of the character described, in combination with an internal combustion engine having a cylinder and a fuel source, intake and exhaust valves in the cylinder, an igniter between said valves, a fuel nozzle arranged to direct fuel against the exhaust valve and thence toward said igniter, said nozzle having a constant size opening in constant communication with the fuel source for directing fuel toward said igniter, and having a spring loaded valve controlling a second opening for directing fuel toward said intake valve.

5. In a device of the class described, in combination with an internal combustion engine chamber having intake and exhaust valves and an ignition device, a fuel nozzle directed into said chamber, and means in said nozzle for directing a portion of the charge toward said exhaust valve at the proper angle to produce deflection of the charge from the surface of said exhaust valve toward the ignition device.

6. In an internal combustion engine, means for introducing air into the engine, an ignition device, an exhaust valve, means for injecting a fuel charge into the air current, means for directing an auxiliary fuel charge against the valve and thence against the ignition device.

7. In an internal combustion engine having means for pumping fuel at variable pressures, means for introducing air into the engine, an ignition device, an exhaust valve, an injector for injecting fuel into the engine, means associated with the injector for injecting a main portion of the fuel charge into the air stream during the admission thereof, means associated with the injector for injecting an auxiliary portion of the fuel charge against the exhaust valve in a manner to be deflected thereby against the ignition device, and means for increasing the proportion of fuel injected against the exhaust valve when the pressure of the fuel is reduced comprising an auxiliary orifice at all times subjected to the fuel pressure of the pumping means for directing fuel against the exhaust valve, and a main orifice controlled by a spring loaded valve.

8. In an internal combustion engine having means for pumping fuel at variable pressures, means for introducing air into the engine, an ignition device, an exhaust valve having a flat head, an injector for injecting fuel into the engine, means associated with the injector for injecting a main portion of the fuel charge into the air stream during the admission thereof, means associated with the injector for injecting an auxiliary portion of the fuel charge against the flat head of the exhaust valve in a manner to be deflected thereby against the ignition device, and means for increasing the proportion of fuel injected against the exhaust valve when the pressure of the fuel is reduced comprising an auxiliary orifice at all times subjected to the fuel pressure of the pumping means for directing fuel against the exhaust valve, and a main orifice controlled by a spring loaded valve.

FRANK C. MOCK.